Figure 1:
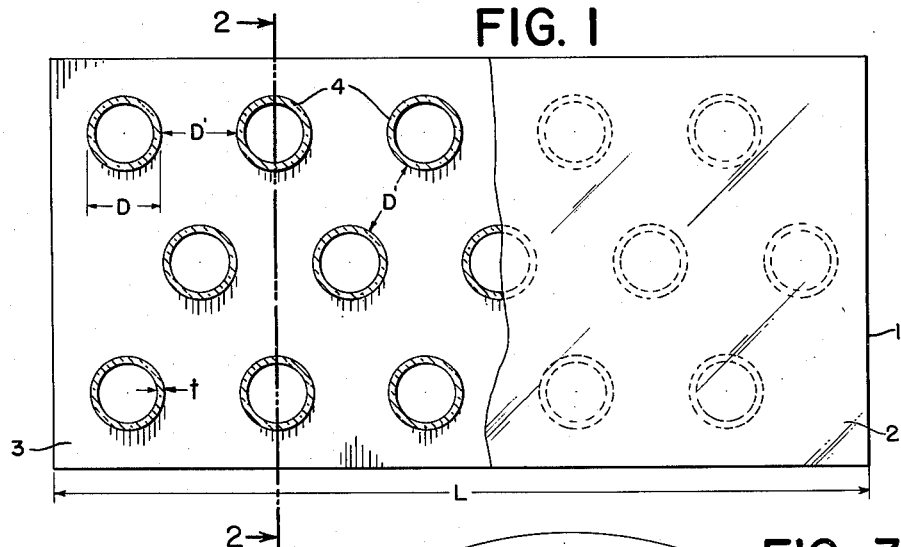

June 20, 1961   E. M. PELKEY ET AL   2,988,959
SANDWICH MIRROR
Filed Dec. 30, 1958

INVENTORS
EDWIN M. PELKEY
JOHN P. SHANLEY
BY Pennie, Edmonds, Morton
Barrows and Taylor
ATTORNEYS

United States Patent Office 2,988,959
Patented June 20, 1961

2,988,959
SANDWICH MIRROR
Edwin M. Pelkey, Norwalk, and John P. Shanley, Danbury, Conn., assignors to The Perkin-Elmer Corporation, Norwalk, Conn., a corporation of New York
Filed Dec. 30, 1958, Ser. No. 783,975
2 Claims. (Cl. 88—105)

This invention relates to mirrors, and has for its object the provision of an improved first-surface mirror which is relatively light in weight, strong and has a high degree of physical stability. More particularly, the invention provides a sandwich mirror comprising two sheets or plates of glass held in spaced relation by a plurality of glass connecting spacers, one of the plates having a precision ground surface on which is formed a first-surface mirror.

The invention is concerned with the problem of providing a first-surface mirror that is light in weight which can be subjected to sudden jerks and rapid oscillations without breaking, or losing dimensional stability such as would impair the uniformity of the mirror surface. For example, the mirror of the invention can be used in an infra-red scanning apparatus in high speed aircraft under a wide range of temperatures and pressures in which service the mirror is subjected to sudden impacts and, in operation, must be oscillated in sudden jerks. To withstand these unavoidable abuses and severe conditions of normal use, the invention provides a mirror made entirely of glass having low mass and great strength, in the form of a sandwich. In order to prevent distortion during production and use, the plates and spacers are made of glass having the same properties, preferably the same kind of glass.

The sandwich mirror has the structural characteristics of a girder or truss comprising two spaced plates of glass and a plurality of tubular spacers in bonded connection to the inner faces of the plates. The plates may be parallel to each other when the mirror has a flat surface, or the plate having the mirror surface may be arcuate, for example spherical, for use in a reflecting telescope. In either case, the tubular spacers are selected of such size as to have an appreciable peripheral area but low mass to provide a relatively large area of support, and the spacers are set in an orderly and carefully spaced arrangement to reduce to a minimum the deflection of the plate glass to the end that one surface may be ground and polished without deflection between the supports which would result in surface waves or other irregularities.

In order to minimize distortions in the fabrication of the mirror, the invention is made by a process which comprises arranging the tubular spacers on one of the plates with a connecting bonding agent, bonding the other plate to the spacers, and after setting of the bonding agent, polishing the mirror surface, placing the assembled mirror in a vacuum chamber and applying a reflecting surface of vaporized aluminum over the polished surface. It is an important feature of the invention that the spacers are bonded with a thermosetting resin that will set at room temperature and thereby effect a secure connection without distortion. The spacers preferably have a small hole to equalize the pressure inside and outside the tubes at all pressures as in the low pressure during the deposition of the aluminum, when at high altitudes, and at low level atmospheric conditions.

The improved mirror may have any suitable exterior shape, for example, rectangular, elliptical or circular, and be of any desired size, varying from a few inches to several feet in diameter.

One mirror of the invention which was rectangular, nine inches long, five inches wide and one inch thick was subjected to a shock of 300 G's with a duration of 2 milliseconds before failure. Another mirror was heat shocked by heating it to 165° F. for two hours and then plunging it into a cold test chamber at —65° F.

Figure 2:
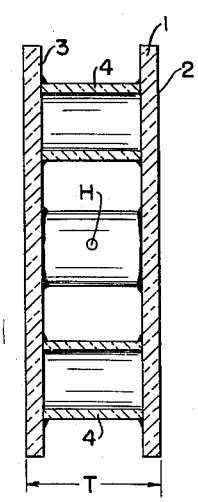
Figure 3:
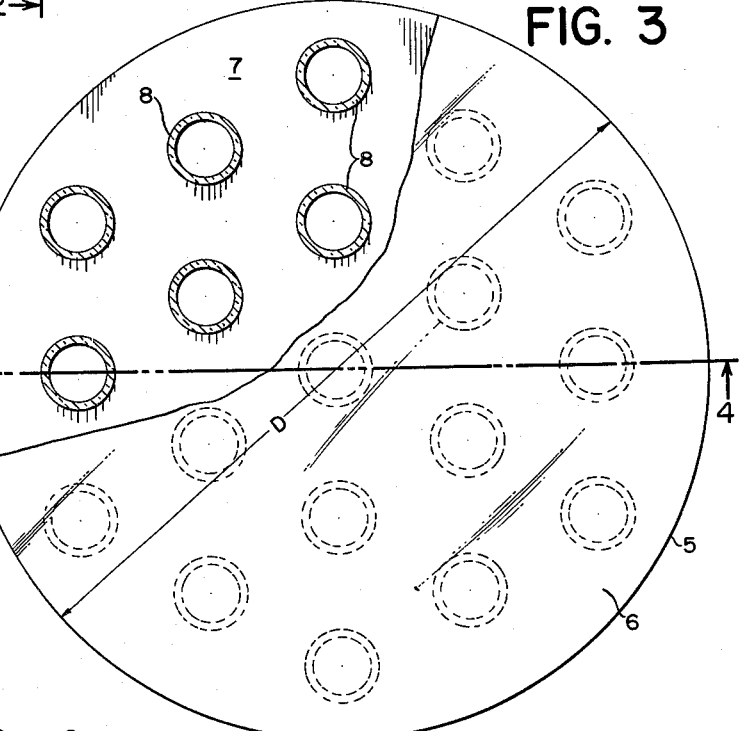
Figure 4:
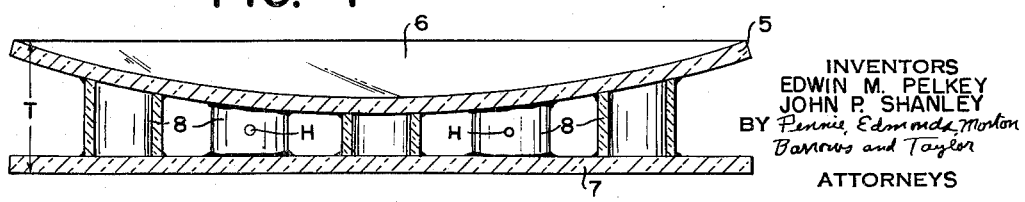

In the accompanying drawings:
FIGS. 1 and 3 are plan views, with parts removed, of mirrors of the invention, and
FIGS. 2 and 4 are sectional views at 2—2, and 4—4 of FIGS. 1 and 3 respectively.

The improved first-surface mirror illustrated in FIG. 1 is of rectangular shape comprising a glass plate 1 having a first-surface mirror 2 of deposited aluminum, a back glass plate 3, preferably the same thickness as plate 1, and a plurality of tubular glass spacers 4. It is important to use glass parts which have identical physical properties, preferably glass having the same composition.

The two plates of glass are bonded to the tubular spacers 4 which support them in appreciable space relation. These spacers are sufficiently long to hold the plates apart a distance T which is the thickness of the mirror. When the mirror has a length L then the length of the spacers should be such that the mirror will have a length-to-thickness ratio of from 4 to 1 to 10 to 1, preferably a ratio of about 6 to 1. The tubular spacers can have any suitable cross-sectional shape such as circular, rectangular or triangular, and have a relatively large diameter with respect to their wall thickness. The wall thickness $t$ should be approximately ½ with respect to the thickness of the plates.

The spacers are cut to very carefully controlled dimensions and have uniformly flat transverse surfaces which are connected to the plates. As illustrated in FIG. 1 the spacers are arranged in a carefully dimensioned relationship with respect to each other so as to provide the maximum of support for the plates while contributing a minimum of weight. It has been determined that the spaces between the adjacent spacers should have a close relationship with respect to the diameter of the spacers. For example, when the spacers have a diameter D the distance D' between the spacers should be from 0.9D to 1.1D.

The embodiment of a first-surface mirror illustrated in FIGS. 3 and 4 is circular in its peripheral external shape and comprises an arcuately shaped plate 5 having a first-surface mirror reflecting surface 6 formed of deposited aluminum and a back supporting plate 7 which is preferably flat. The plates 5 and 7 are held in the space relation by a plurality of spacers 8. These spacers are provided in such a length that the maximum over-all thickness T of the mirror with respect to the diameter D is such that the ratio of D to T is in the range of 10 to 1 to 5 to 1, most advantageously in the range of about 6 to 1. It is to be understood that the spacers are similar to those described in connection with the mirror described in FIGS. 1 and 2 and that they have transverse flat surfaces which are connected to plate 7. The surfaces connected to plate 5 are of necessity sloped and arcuate. These spacers are arranged as described in connection with FIGS. 1 and 2 to provide a maximum of support with a minimum of added weight.

The mirror illustrated in FIGS. 3 and 4 can be used effectively as the mirror for a reflecting telescope or in any other instrument where the converging of radiation, either in the visible spectrum or otherwise, is necessary.

In forming the mirrors illustrated in the drawings according to a process of the invention the plates 3 and 7 are set in the horizontal position and the precisely cut faces of the spacers are coated with a self-setting bonding resin, such for example as an epoxy resin containing a catalyst, which causes the resin to become thermosetting at normal room temperatures. These spacers are placed in contact with the plates, weighted and left to rest for a few hours until the resin has completely set. This operation is repeated by bonding the upper transverse cut surfaces of the spacers to the plates 1 and 5. Again, a sufficient time is allowed to lapse until the resin has set to a hard bonding consistency.

After the aforementioned elements have been completely assembled the glass structure just described is subjected to a grinding and polishing operation to give to the surface 2 of FIGS. 1 and 2 a uniformly flat and optically effective surface, and the surface 6 of FIGS. 3 and 4 is also ground and polished to give to that surface an optically uniform surface of the desired curvature. During this precision polishing operation it is necessary that the surface have dimensional stability so that there will be a minimum of deviation from the desired surface and this is provided by the support of the carefully arranged spacers.

After the mirror surface has been formed the glass structure is placed in a vacuum chamber at a very low pressure and vaporized aluminum is deposited on the polished surface to form the mirror having a first-reflecting surface.

In order to prevent distortion of the structure while under the vacuum treatment the spacer tubes are each provided with a small vent hole H. This vent hole also prevents unequal stresses from forming in the spacers when the mirror is used under variable pressures.

The improved mirror of the invention has a relatively great strength in relation to its weight and is capable of being subjected to violent shocks such as may result when the mirror is used, for example in an infra-red scanning device, as in reconnaissance aircraft. Such aircraft operate under a very wide range of pressure and temperature and it is necessary that the reflecting surfaces maintain dimension stability to perform accurately at all times, and that the mirror can withstand the repeated shocks to which it is subjected in such aircraft.

We claim:
1. An improved first-surface mirror which comprises two plates of glass one of which has on its exterior surface a mirror, a plurality of tubular glass spacers bonded at one of their ends to the opposite surface of said mirror plate and each having a vent hole therein, the other plate being bonded to the opposite ends of the spacers, the spacers being of such length that the total thickness of the mirror is not less than one-tenth the length of the mirror, the plates and spacers being formed of glass having the same physical properties, and said spacers being spaced from each other a distance varying from 0.9 to 1.1 times their diameter and being arranged to support the plates during polishing of the mirror surface and to hold the mirror against distortion during use.

2. An improved first-surface mirror which comprises two plates of glass one of which has on its exterior surface a mirror, a plurality of tubular glass spacers bonded to the opposite surface of said mirror plate and each having a vent hole therein, said spacers being cylindrical and being spaced from each other a distance varying from 0.9 to 1.1 times their diameter, the opposite ends of the spacers being bonded to the other plate, said bonding being effected by a material which sets to a hard state at room temperature, the thickness of the plates and the length of the spacers being such that the over-all thickness of the mirror with respect to its length is in the ratio of from 1 to 5, to 1 to 10, all the glass of the mirror having the same physical properties.

References Cited in the file of this patent
FOREIGN PATENTS

| | | |
|---|---|---|
| 309,236 | Great Britain | Apr. 11, 1929 |
| 582,275 | France | Oct. 11, 1924 |